Figure 1:
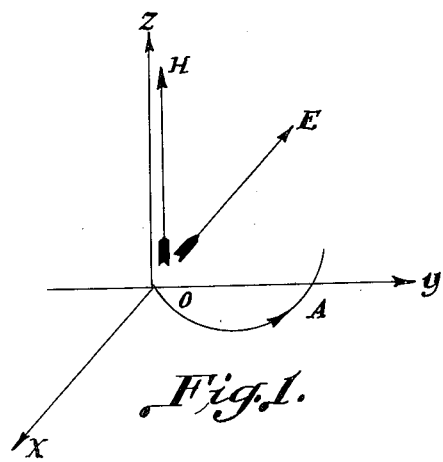

March 27, 1945.   E. LABIN   2,372,210

METHOD OF GENERATING FREQUENCY MODULATED WAVES

Filed March 26, 1942

Inventor
EDOUARD LABIN
By
Attorney

Patented Mar. 27, 1945

2,372,210

UNITED STATES PATENT OFFICE 2,372,210

METHOD OF GENERATING FREQUENCY MODULATED WAVES

Edouard Labin, Buenos Aires, Argentina, assignor to Hartford National Bank and Trust Company, Hartford, Conn., as trustee Application March 26, 1942, Serial No. 436,374

11 Claims. (Cl. 315—18)

I. INTRODUCTION

1. F. M. Waves

The present invention relates to frequency modulated waves as used in radio transmission, and more particularly to a method for generating such waves which shall be immune from the difficulties and disadvantages attending on the methods hitherto employed for a similar purpose.

It is well known that the chief difficulty in connection with modulated frequency transmission is to ensure the stability of the central or "carrier" frequency of the wave. The desirable stability could be secured by taking the carrier fraction of the wave to be generated from a quartz pilot oscillator, whereby advantage would be taken of the whole stability of standard transmitters.

In applying this principle, however, a certain difficulty arises, as the following discussion will show.

Let the intelligence introduced into the wave be $$s = s(t) = A\sigma(t) \quad (1)$$

The second form of writing the expression is used when it is desired to clear the maximum crest of the intelligence, which will be denoted by A, the remaining function not varying more than between $-1$ and $+1$ and being therefore denoted by the letter $\sigma$.

The wave to be generated will have an instantaneous frequency $$\Omega = \Omega_c + \Omega_v \quad (2)$$

where the fixed portion $\Omega_c$ will be called the "central" or "carrier" frequency, and where the variable portion $\Omega_v$, often called "deviation," will be modulated at the rhythm of the intelligence, that is to say:

$$\Omega_v(t) = 2\pi k s(t) = 2\pi k A\sigma(t) = \beta\sigma(t) \quad (3)$$

where $k$ is the slope of the modulation characteristic curve in cycles per amplitude of intelligence.

By writing the modulation $A\sigma(t)$, Equation 3 shows that $kA$ will be the crest or amplitude of the deviation $\Omega_v(t)$, which may also be written $\beta/2\pi$ and is naturally called "maximum deviation" or also "excursion" of the instantaneous frequency of the wave.

For the purpose of fixing orders of magnitude of the quantities let us say that in practice we have $$\begin{matrix}\Omega_c \approx 2\pi.45 \text{ mc. (from 30 to 100 mc., or 10 to 3 meters)} \\ \beta \approx 2\pi.75 \quad \text{kc. (from 50 to 100 kc.)}\end{matrix} \quad (4)$$

It will be seen that the excursion is very small compared with the central frequency.

Now it is known that a wave whose instantaneous frequency is $\Omega(t)$ is written $U \sin \int \Omega(t)dt$, $U$ being the amplitude of the wave. With the value of $\Omega$ taken from Expressions 2, 3, we thus obtain the following expression for the wave to be generated.

$$u = U \sin [\Omega_c t + \psi]$$
where $\psi = 2\pi k \int s(t)dt = 2\pi k A \int \sigma(t)dt = \beta \int \sigma(t)dt$ (5)

2. Integrating microphone

In the first place it should be noted that it is very easy to obtain a signal which will reproduce the integral of a given intelligence $s(t)$. Suppose, for example, that said intelligence is a tension applied to the grid of a valve of internal resistance $Ri$. Two procedures are then possible according to whether it is desired to have the integrated signal in the form of a voltage or in that of a current.

In the first case, $Ri$ is taken very large, that is to say, the valve will be a pentode, and the plate circuit is closed on a capacity C of which the maximum impedance—which occurs at the minimum frequency of the intelligence—is small compared with $Ri$. If $C=0.003\mu f$., we already have $$\frac{1}{C\alpha} = 100,000 \text{ ohms}$$

when $\alpha=2\pi \times 50$ p. p. s., whereas $Ri$ will easily have a value of 1,500,000 ohms. Now the current $i$ supplied to C by the valve will be independent of what happens in the plate circuit, and always equal to the value of the short-circuit current $i=S.s(t)$, where S is the slope of the valve. Since the tension $v$ at the terminals of C has the value $$\frac{1}{C}\int i\,dt$$

this tension will have the desired form $$v = \frac{S}{C}\int s(t)dt$$

In the second case, in which the integrated signal is desired in the form of a current, $Ri$ is taken very small, that is to say, the valve will be a triode, and the plate circuit is closed on an inductance L of which the minimum impedance—which occurs at the minimum frequency of the intelligence—is large compared with $Ri$. If $L=40$ henries, we have $L=15,000$ ohms, with $\alpha=2\pi \times 50$ p. p. s. whereas $Ri$ will easily have a value of 3,000 ohms. Now the tension supplied to L by the valve will be independent of what happens in the plate circuit and always equal to the open circuit value $e=\mu s(t)$, where $\mu$ is the coefficient of amplication of the valve. Since the value of the current $i$ in L is $$i = \frac{1}{L}\int e\,dt$$

this current will have the desired form $$i = \frac{\mu}{L}\int s(t)dt$$

Here the value of the integrating element is evidently more troublesome than in the former case, because coils of 40 henries resonate more readily before the upper extremity of the intelligence band. However, it is possible with care to make such coils, and it should also be noted that in speech transmission, that is to say, in light equipments, we should have $\alpha_{min} = \pi 2 \times 250$ p. p. s., so that it would be sufficient to have a coil of $L=8$ henries, which is quite an easy matter.

A system consisting of a microphone, one or more ordinary amplifying stages and the stage which has just been described (followed, if desired, by other ordinary amplifying stages) will hereinafter be called an "integrating microphone." It is a typical element of frequency modulation.

3. *Range of variation of phase displacement*

The integration brings to light an inverse proportionality with respect to the frequency of the intelligence. In fact, if we reduce the intelligence to the only pure sound $s = A \cos \alpha t$, then $$\int s(t) dt = \frac{A}{\alpha} \sin \alpha t$$

and consequently:

$$\psi = 2\pi \frac{KA}{\alpha} \sin \alpha t = \frac{\beta}{\alpha} \sin \alpha t = \zeta \sin \alpha t \qquad (6)$$

The "index of modulation"

$$\zeta = \frac{\beta}{\alpha}$$

measures the amplitude of the variable angle $\psi$. In a complete intelligence, this amplitude is a maximum when the sound of lowest frequency $\alpha_m = 30$ p. p. s.) has the highest admitted crest $A$, which defines the total excursion it is desired to give to the wave, that is to say that which gives $\beta \approx 75,000$. The value of this maximum is, therefore, approximately equal to $$\frac{7.5 \times 10^4}{3 \times 10} \approx 2,000 \text{ radians}$$

and it will be necessary to know how to create phases of up to this magnitude.

Before following up the consequences of this result, the other side of the matter will be considered, that is to say, the minimum value which $\psi$ can have. This minimum will be attained when the sound of the highest frequency ($\alpha_M \approx 10,000$, or 2,000 times $\alpha_m$) has the minimum amplitude, which may be 100 to 1,000 times smaller than the maximum. Consequently, $\psi$ may drop down to a value $2 \times 10^5$ or $2 \times 10^6$ smaller than its maximum.

For the tension $\gamma$ generated in the integrator, there must be the same range of variation, and this offers a problem in connection with the minimum values, because if the maxima are arranged within the readily manageable domain of a few volts, they will come into the field of microvolts where parasitic voltages reign. The difficulty has been overcome by carefully designing the integrator, but it is alway useful to look for something which will allow the integrated signal to be maintained as high as possible with respect to the parasitics, and it will be seen that the method of the present invention represents progress in this direction.

4. *The fundamental difficulty and the object of the present invention*

On the other hand, from the point of view of the H. F. wave to be generated, the enormous value (in radians) of the angle $\psi_{max}$ constitutes a fundamental difficulty. Indeed, if the Expression 5 for the frequency modulated wave is considered, it might be thought easy to manufacture it with an $\Omega_c$ as stable as desired, by sending the output of a stabilized pilot ($\Omega_c$) through a phase shifter the phase displacement of which is $\psi$, and therefore controlled by the (integrated) intelligence. But an ordinary phase shifter never gives phase displacements greater than a few $\pi$, the amount being much less if consideration is given to the fidelity of the control by the intelligence. Now, to obtain the 2,000 radians, it would be necessary to multiply the argument generated from 1,000 to 10,000 times. This process has been and still is, used, but it suffers from many complications and difficulties of arrangement. Hence the first aim of anyone wishing to provide frequency modulated systems of modulation, should be to find some way of directly introducing the phase displacements which are able to attain the required values. The present invention provides a method for achieving this.

It is, therefore, an object of the present invention to provide a novel method of generating a frequency modulated wave, which shall satisfactorily overcome the above-mentioned difficulties in a highly efficient manner. It is a further object of this invention to provide a method of generating a frequency modulated wave in which the requisite phase displacement is produced in a direct manner.

Figure 2:
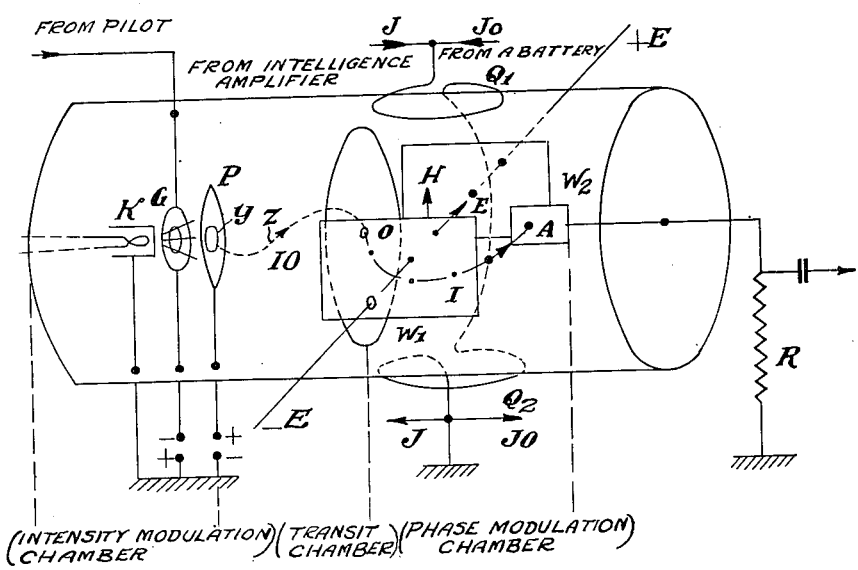

These and other objects and advantages of the present invention will become apparent in the course of the following description thereof, and with the aid of the accompanying drawing, in which:

Fig. 1 is a diagram illustrating the effect of a magnetic field H on a beam of electrons, and Fig. 2 is a diagram of the principal portions of a circuit arrangement whereby the method of the present invention may be carried out.

II. THE NEW METHOD

1. *Fundamental ideas*

The novel method, involving direct phase displacement, is based on the following theoretical considerations.

In order to achieve phase displacements of high values, phase shifting properly so called, created in ordinary circuits, must be abandoned, and recourse must be made to phenomena of retardation for finite periods of propagation, from which it follows that the usual voltages and the currents circulating in conductors at a velocity of 300,000 kms./sec. must be abandoned in favor of cathode rays, that is to say, currents of electrons in vacuum, which are propagated at much lower velocities. To obtain a given phase displacement, that is to say, a given retardation in the transit time of an electron between two electrodes, the length of path and the speed of the electron may be modified alternatively or simultaneously, by the aid of suitably arranged magnetic or electric fields. The most suitable method will now be described.

An electronic beam which penetrates into a zone in which a magnetic field H obtains, and has an initial velocity perpendicular to H, performs revolutions in the plane perpendicular to H for which the initial velocity holds, and travels around in a circle at a pulsation.

$$\omega = 22.2 \times 10^6 \cdot H \qquad (7)$$

where $\omega$ is in $2\pi \times$ p. p. s. and H is in amps./cm.

The important point in this result is that $\omega$, and therefore also the time taken for one revolution, that is to say $$\frac{2\pi}{\omega}$$

does not depend on anything except the field H.

The initial velocity or the presence of another field define other characteristics of the path. For example, these additional factors may make the path helical or cycloidal of various sizes, but in all cases, one complete revolution around the field will always be exactly $$\frac{2\pi}{\omega}$$

seconds, with $\omega = 22.2 \times 10^6 \cdot H$.

As, in the present method, the ray will be used so that its time of travel shall provide the desired retardation, it will be convenient to separate its point of departure from the point at which it is to be captured. The simplest method of doing this appears to be to use, in addition to the magnetic field H, a directional electric field E perpendicular to H, according to the arrangement of Fig. 1. It is then found that the electrons describe a cycloid, of which only the first arc OA will be used.

2. Calculation of the phase displacement

Let it be supposed that the beam of electrons entering at O has been modulated in intensity by a grid, and with an oscillation $\sin \Omega_c \cdot t$ which derives from the stabilised pilot. The intensity of the current carried by the beam (or that of its variable part, if it has additionally a mean value) will thus be, at the point O:

$$I = I_o \cdot \sin \Omega_c \cdot t \qquad (8)$$

On reaching A, the beam has traversed a path which has lasted $$\frac{\pi}{\omega}$$

seconds, (half a full revolution) so that its intensity will be:

$$I = I_o \cdot \sin \Omega_c \left( t - \frac{\pi}{\omega} \right) = I_o \cdot \sin \left( \Omega_c \cdot t - \pi \frac{\Omega_c}{\omega} \right) \qquad (9_1)$$

and, if the value of $\omega$ is introduced, and we write $\overline{F_c}$ for the central frequency expressed in mc.:

$$I = I_o \cdot \sin \left[ \Omega_c \cdot t - \frac{2\pi^2 \cdot \overline{F_c}}{22.2 \cdot H} \right] = I_o \sin \left[ \Omega_c \cdot t - 0.932 \frac{\overline{F_c}}{H} \right] \qquad (9_2)$$

The beam will again be changed into a current on being captured by a collector anode followed by the return resistance R. The magnitude used will be the tension RI. The collector will be given a voltage to overcome the back voltage originated by the passage of the current through R. As to the distance OA, it can be shown by the theory of the displacements of cathode rays that its value will be $$\overline{OA} = 3.58 \frac{E_2}{H} \text{(in cms. with E in volts/cm.} \qquad (10)$$
$$\text{and H in amps./cms.)}$$

if the electrons enter the field at zero initial velocity. With the values of the field H which will be used, as explained below, this formula will give distances of the order of some centimeters for the directional electric fields E of the order of millivolts/cm. This result is natural, since it translates the enormous sensitivity of the movements of the rays at a function of the external fields when the electrons have no velocity. More exact investigation, taking into account the disturbances due to fluctuating initial velocities, indicates it might be advantageous to pre-accelerate the electrons a little, or to focus them with a pre-lens, or to define their points of entry by means of a pin hole. Such procedure, which belongs to the technique of slow electrons, and which will not be discussed further here, may give rise to more complicated paths than the cycloid arc shown in Fig. 1, (although such paths would be regular and calculable) but without changing the only important fact, namely, that the time taken in traversing a semi-revolution is always the same and equal to $$\frac{\pi}{22.2 \times 10^6 \cdot H}$$

3. Control of the phase displacement by the intelligence

Contemplation of Equation $9_2$ shows that the aim has been practically achieved, since there is available a phase displacement $$\psi = 0.932 \cdot \frac{\overline{F_c}}{H} \qquad (11)$$

which may be modulated up to any values by modulating the field H. If the complete field is modulated, the distance OA will vary enormously during the modulation, and this would necessitate a collector several meters long, given the range of $10^6$ times through which H may vary. Such dimensions could be avoided by modulating simultaneously the field E in a sense to oppose the elongation at all times, but this would require a special circuit. Moreover, so that the angle $$\psi = \frac{0.932 \overline{F_c}}{H}$$

may have the signal $\gamma = a \int s(t) \cdot dt$ in the numerator, as it should according to Equation 5, it would be necessary to derive H from the signal $\gamma$ by a peculiar step which would be capable of giving an output inversely proportional to its input. In order to escape these difficulties and leave the system completely normal and straightforward, it suffices to modulate only a small portion of H, the main portion remaining fixed:

$$H = H_0 + h,$$
($h$ modulated with a maximum amplitude $H_o$) (12)

From this, $$\psi = 0.932 \frac{\overline{F_c}}{H_o + h} \approx 0.932 \frac{\overline{F_c}(H_o - h)}{H_o^2}$$

that is, $$\psi = \psi_o - \frac{\psi_o h}{H_o} \text{ with } \psi_o = 0.932 \cdot \frac{\overline{F_c}}{H_o} \qquad (13)$$

The term $\psi_o$ represents, in the expression for the wave, merely a fixed phase. So far, that origin has been taken implicitly for the phases, which is defined by the Expression 8 for the oscillation issuing from the pilot. But this oscillation is not present at the point of emergence, so that $\psi_o$ will serve to define the origin of phases at the point where the wave is used. Once this role of the constant angle $\psi_o$ has been fixed, it may be omitted from the expression for the current generated at the point A, and said expression may be written in the form $$I = I_o \sin\left[\Omega_c t - \frac{\psi_o h}{H_o}\right], \quad (14)$$

($h$ being proportional to the integrated modulation)

which is exactly what was required.

Moreover, it has thus been possible to fix the elongation $\overline{AO}$ of the electron path, since this will now be defined by the mean portion $H_o$ of the magnetic field, varying very little with the modulation $h$. Thus a small collector may be used, and, if a controlling electric field is employed, such field E may be fixed, whereby it fully conserves the functions of an auxiliary magnitude.

4. Orders of magnitude

To estimate the orders of magnitude, let it be supposed that the maximum amplitude which the field $h$ may have, is 20% of the mean field $H_o$. On this assumption, the fundamental approximation made, namely:

$$\frac{1}{H_o + h} = \frac{H_o - h}{H_o^2} \quad (15)$$

is correct within 4%, which is even more admissible, when it is remembered that the case of $h$ maximum, for which the minimum frequency of sound must coincide with the maximum amplitude of sound, occurs only rarely in the course of a normal transmission. Hence the phase displacement originated by this maximum, will, according to (13), be approximately $$0.2 \frac{\overline{F_c}}{H_o}$$

and this is the expression which must attain the order of magnitude of the 2,000 radians:

$$0.2 \frac{\overline{F_c}}{H_o} = 2,000 \quad (16_1)$$

If $\overline{F_c} = 50$ (mc.), it will be seen that the mean field will have the very convenient value of $$H_o = 0.005 \text{ amp./cm.} = 5 \text{ ma./cm.} \quad (16_2)$$

Under these conditions, the modulated field has the maximum value $0.2.H_o$, that is to say $$h_{max} = 1 \text{ ma./cm.} \quad (16_3)$$

It should be noted that no change will be introduced if the operation is performed at a lower central frequency in order to admit of the possibility of multiplying it in a number of stages, since this is frequently useful in itself. In fact, the displacement to be created, or the maximum of $\psi$, will be smaller in proportion to the lower value chosen for $\Omega_c$, and $H_o$ will retain exactly the same value as that which has just been calculated. It will be seen, on the other hand, that that value defines the excursion, so that it provides a very simple method of controlling this important factor of the wave without changing any other adjustment. This property of the system would appear to be important in several cases of mobile transmissions since it is thereby possible to modify the frequency excursion during communication to over-ride statics or man-made noise and improve intelligibility.

III. PRACTICAL EXECUTION

1. Creation of the variable field

The final step will now be considered. To create the modulation field $h$, obviously a system of magnetising turns will be used, through which will be passed a current $i$, which reproduces the (integrated) intelligence. The current $i$ will be proportional to $h$, that is to say, it will vary between a maximum value $i_{max} = Bh_{max}$ and a minimum value, $i_{min}$, $2 \times 10^5$ or $2 \times 10^6$ times less.

The coefficient of proportionality B, or the magnetising efficiency of the current, represents a parameter of supplementary adjustment, which can be used to satisfy the condition that $i_{min}$ shall be well above the level of the parasitic currents. It can be shown that in normal cases an $i_{min}$ of $10^{-7}$ amp. is already 1,000 times above the level of noise (60 db.). This is fairly above the usual practice. Then $i_{max}$ would be equal to $2 \times 10^5$ or $2 \times 10^6$ times more, which would, at the utmost, give a value of 100 ma., and this can still readily be obtained with valves of small size. So far as the generation of the field $h_{max} = 1$ ma./cm. is concerned with an $i_{max}$ of 100 ma., this presents no problem, and an infinite variety of embodiments are available, by varying the diameter of the turns and their number, or by dividing the system into two parts, of which one partially opposes its field to the field of the other, etc. It is interesting to note that too great a sensitivity is here available. The flexibility of the system is so great that it is not necessary to show that the magnetising system may always be arranged so as to create the field with all the desirable uniformity along the whole trajectory of the beam. It should be added that this condition, although advantageous, is not absolutely indispensable, since it would merely change the calibration of the phase displacement created as a function of the current, which would call for an adjustment without altering the validity of the method. It has thus been possible, as previously stated, to improve the difficult situation which usually obtains at the high frequency end of the intelligence.

2. Creation of the mean field

The current $i_o$ which defines the mean magnetic field $H_o$, flows through the same system of turns as the modulated current $i$, but it will be derived from an independent source. In this connection, it should be noted that the current $i_o$ must not vary (with a rhythm comparable to that of the intelligence) by more than the minimum value of the current $i$, otherwise such variation would appear as a modulation signal. According to what has been said hereinabove this means that $i_o$ must be stabilised within some $10^{-6}$. Obviously, it is the stability of the value during brief time intervals which is here concerned, since a slow drop would not harm the modulation, but would merely slowly increase the excursion of the central frequency of the emitted wave which could be corrected by occasionally touching up the source of $i_o$. With a good, well-kept battery, and possibly with the aid of a filter, this stability of the value of $10^{-6}$ is readily achieved. The same may be said of the directive electrical field E, when used.

Since the magnetic fields useful for the present purpose are very small, being, particularly, smaller than the earth's field, it will be necessary to enclose the tube in a shield housing of Permalloy and the wire carrying the high frequency oscillation of the pilot, should likewise be shielded.

3. Embodiment of the tube

Fig. 2 shows a diagram illustrative of the principles of embodiment of the present invention. The embodiment is shown without much definition as to the form of the details, since, as will be clear to those skilled in the art, the embodiment is susceptible of a multiplicity of variations which will all be equivalent provided that the fundamental principle of the method is realized. This principle may be stated thus: The intensity of a beam of electrons is controlled by the oscillations of the desired central frequency taken from a stabilised pilot, and has impressed upon it the retardation in propagation corresponding to the desired phase displacement (or frequency modulation) by means of a retarding field controlled by the integrated intelligence. On this basis, any suitable embodiment will comprise essentially: an intensity modulation zone or chamber, diagrammatically shown in Fig. 2 as a triode K, G, P, into which the piloted oscillation enters at G, and a phase modulation zone or chamber, shown diagrammatically in Fig. 2, as an assembly of two turns $Q_1$, $Q_2$, which create the retarding field and through which the mean current $i_0$ and the modulating current $i$ circulate. The example shown also includes a pair of plates $W_1$, $W_2$ adapted to generate an auxiliary electric field E. The lead from the collector A forms the output lead of the tube.

It also lies within the purview of this invention to provide, in some instances, a transit zone, which may comprise an electronic lens and a speed filter of any known type. Such a transit zone will be included where it is desired to control with great accuracy the point of emergence of the beam from the intensity modulation zone and its point of entry into the phase modulation zone. In Fig. 2, said transit zone has been diagrammatically represented by a hole Y in the plate P, and an intermediate path Z shown in broken lines and having the helical form usual in magnetic lenses.

Although, for clarity, these three highly important parts of the tube have been shown as separate zones arranged in series, it is obvious that embodiments may be conceived in which said parts are intermingled to a greater or less extent. For example, the intensity modulation chamber may simultaneously fill the part of the transit lens, or the latter may be omitted and reliance placed exclusively on a hole in an electrode really disposed like the plate P of the diagrammatic triode of Fig. 2. Alternatively, the transit zone may be reduced to a velocity filter with slits arranged around a circle, and reliance placed on the last slit to define the point of entry of the beam into the phase modulation chamber. In some embodiments, if the point of entry of the beam into said phase modulation chamber is controlled with sufficient accuracy, the auxiliary electric field may be dispensed with.

A useful simplification in the application of the present process on the basis of the instruments existing in classical installations of existing transmitters, resides in the possibility of joining up the intelligence integrating stage to the modulator tube. Since the latter is, in fact, controlled by a current $i$, it is sufficient to make the magnetising turns a part of the coil ensuring the integration in one of the two methods explained above. The triode of which this soil constitutes the plate circuit will then become a part of the modulating unit, and its grid, which will be one of the input terminals, may have impressed on it the output of any kind of usual microphonic amplifier.

In view of the approximate numerical values which have been established, it will be understood that the complete tube within its Permalloy housing may have a size of the order of 30 to 60 cms. in the three dimensions. Such housing represents the only new part which a standard transmitter will require in order to operate on frequency modulation. A conductor is taken from the classical pilot to a terminal of the housing, another conductor is taken from the classical amplified of the microphone (simple or integrating) to another terminal of the housing, while at a third terminal thereof, the signal is taken off, which need be amplified only in a classical manner through the stages of the transmitter up to the aerial. This property of the novel system of having a very few and simple independent adjustments is of commercial importance, since the F. M. circuits do no longer absorb the largest part of the adjustments of a transmitter. Hence the unit, which may be denominated "universal frequency modulator," may be sold separately. It will also be noted that the unit is of fundamentally simple construction and readily adjusted. Its use would be particularly welcome in connection with mobile equipment.

4. *General rules of execution*

In addition to the fundamental principle enunciated hereinabove the practical embodiment of the invention should be guided by the following rules: 1. The retarding field should be magnetic because the retardation of the electrons is more sensitive under the action of magnetic fields, and because this type of retardation is the only one which is independent of the initial velocities of the electrons, provided that these do not vary so much as to destroy the hypothesis that all the individual paths represent the same fixed fraction of a revolution around the magnetic field. 2. Care should be taken to avoid high velocities of entry into the modulation chamber, not only in order to reduce the effect of their possible fluctuations on the validity of the above-mentioned hypothesis, but also because, otherwise, the trajectories rapidly acquire considerable sizes. As already stated, the technique of the slowly-moving electrons will be used.

Although the present invention has been described with reference to certain particular and preferred forms of embodiment, it should be understood that it is not limited thereto, but that it is susceptible of sundry modifications without thereby departing from the spirit and scope of the invention, as defined in the accompanying claims.

I claim:

1. A method of producing wave-length modulated electrical energy by means of a discharge tube having an electron beam generating assembly terminating at a fixed point serving as an effective origin for the beam, a passive collector electrode spaced from said fixed point, and means for generating an electron-director field extending over a major portion of the distance between said fixed point and said passive collector electrode and defining a wave-length modulation zone, comprising the steps of generating a beam of electrons within the generating assembly, modulating the electron beam before the beam reaches said fixed point to produce variations in the intensity of the beam, passing the intensity modulated beam through the wave-length modulation zone and impressing thereon a curvilinear trajectory at all points of the travel of the beam through the said zone, modulating the intensity of the director field proportionally to a quantity representing intelligence to produce variations in the time of travel of the beam in said zone and collecting the intensity and wave-length modulated electron beam without thereby imposing further modulation on the beam to produce electrical energy corresponding to the variations of the collected electron beam.

2. A method of producing wave-length modulated electrical energy by means of a discharge tube having an electron beam generating assembly terminating at a fixed point serving as an effective origin for the beam, a passive collector electrode spaced from said fixed point and director field generating means for generating an electron-director field extending over the entire distance between said fixed point and said passive collector electrode and defining a wave-length modulation zone, comprising the steps of generating an electrical oscillation of stable and predetermined frequency, generating a beam of electrons within the generating assembly, modulating the electron beam before the beam reaches said fixed point at a rate proportional to the frequency of said electrical oscillation to produce corresponding variations in the intensity of the electron beam, passing the intensity modulated beam through said wave-length modulation zone and impressing thereon a curvilinear trajectory at all points of the travel of the beam in said zone from the fixed point to the collector, modulating the intensity of the director field proportionally to a quantity representing intelligence to produce corresponding variations of the time of travel of the beam in said zone, and collecting the intensity and wave-length modulated electron beam without thereby imposing further modulation on the beam to produce electrical energy corresponding to the variations of the collected electron beam.

3. A method of producing wave-length modulated electrical energy by means of a discharge tube having an electron beam generating assembly terminating at a fixed point serving as an effective origin for the beam, a passive collector electrode spaced from said fixed point, and director field generating means for generating a compound electron-director field extending over the entire distance between said fixed point and said passive collector electrode, defining a wave-length modulation zone and comprising a mean portion and a variable portion, comprising the steps of generating a beam of electrons within the generating assembly, modulating the electron beam before the beam reaches the fixed point to produce variations in the intensity of the beam, passing the intensity modulated beam through said wave-length modulation zone and impressing thereon a curvilinear trajectory at all points of the travel of the beam from the fixed point to said collector, modulating the intensity of the variable portion of the compound director field proportionally to a quantity representing intelligence to produce variations in the time of travel of the beam in said zone and collecting the intensity and wave-length modulated electron beam without thereby imposing further modulation on the beam to produce electrical energy corresponding to the variations of the collected beam.

4. In a method of producing wave-length modulated electrical energy according to claim 3, the step of controlling the frequency excursion of the modulated energy by varying the intensity of the mean portion of the compound director field.

5. A method of producing wave-length modulated electrical energy by means of a discharge tube having an electron-beam generating assembly terminating at a fixed point serving as an effective origin for the beam, a passive collector electrode spaced from said fixed point, and means for generating an electron-director field extending over the entire distance between said fixed point and said passive collector electrode and defining a wave-length modulation zone, comprising the steps of generating a beam of electrons within said generating assembly, modulating the beam before the beam reaches said fixed point to produce variations in the intensity of the beam, passing the intensity modulated beam through said wave-length modulation zone and impressing thereon a curvilinear trajectory at all points of the travel of the beam from the fixed point to the collector electrode, modulating the director field in a manner to cause said beam to impinge on the collector electrode in a direction substantially normal to the collector electrode at any point of incidence thereon and at a rate proportional to a quantity representing intelligence to produce variations in the time of travel of the beam in said zone, and collecting the intensity and wave-length modulated electron beam without thereby imposing further modulation on the beam to produce electrical energy corresponding to the variations of the collected electron beam.

6. A method of producing frequency modulated electrical energy by means of a discharge tube having an electron beam generating assembly terminating at a fixed point serving as an effective origin for the beam, a passive collector electrode spaced from said fixed point, and means for generating an electron-director field extending over the entire distance between said fixed point and said passive collector electrode and defining a frequency modulation zone, comprising the steps of generating an electron beam within said assembly, modulating the beam before the beam reaches said fixed point to produce variations in the intensity of the beam, passing the intensity modulated beam through the frequency modulation zone and impressing thereon a curvilinear trajectory at all points of the travel of the beam between said fixed point and the collector electrode, modulating the director field proportionally to a quantity representing integrated intelligence to produce variations in the time of travel of the beam in said zone, and collecting the intensity and frequency modulated beam without thereby imposing further modulation on the beam to produce electrical energy corresponding to the variations of the collected electron beam.

7. A method of producing wave-length modulated electrical energy comprising the steps of generating a beam of electrons, projecting the beam of electrons in a given direction along two given points, modulating the intensity of the electron beam before the beam reaches the first of said points, impressing a curvilinear trajectory on the electron beam along substantially all points of travel of the beam between said given points proportional to a quantity representing intelligence, and collecting the modulated electron beam at the second of said given points in a passive manner without thereby imposing further modulation on the beam to produce electrical energy corresponding to the variations of the collected beam.

8. Electrical apparatus comprising a discharge tube having an evacuated envelope, an electron-beam generating system including a control electrode and a passive collector electrode spaced from said control electrode and from a fixed point lying between the control electrode and the collector electrode, means including said control electrode for varying the intensity of the electron beam, means for generating an electron-director field extending over substantially the entire distance between said fixed point and said passive collector electrode for impressing a curvilinear path to the electron-beam between said fixed point and said collector electrode, and means to modulate the intensity of said director field to produce variations in the time of travel of the beam between said fixed point and the collector electrode.

9. Electrical apparatus comprising a discharge tube having an evacuated envelope, an electron-beam generating system including a control electrode and a passive collector electrode spaced from said control electrode and from a fixed point lying between the control electrode and the collector electrode, means including said control electrode for varying the intensity of the electron beam, means to produce a magnetic field intersecting the path of the electron-beam and extending over substantially the entire distance between said fixed point and the collector electrode for imparting a curvilinear path to the electron beam between said fixed point and said collector-electrode, and means to modulate the intensity of the magnetic field to produce variations in the time of travel of the beam between said fixed point and the collector electrode.

10. Electrical apparatus comprising a discharge tube having an evacuated envelope, an electron-beam generating system including a control electrode and a passive collector electrode spaced from the control electrode and from a fixed point lying between the control electrode and the passive electrode, means including said control electrode for varying the intensity of the electron beam, means for generating electro-static and magnetic fields co-extending over substantially the entire distance between said fixed point and said passive collector electrode for imparting a curvilinear path to the electron-beam between said fixed point and said collector electrode, and means to modulate the intensity of said fields to produce variations in the time of travel of the beam between said fixed point and the collector electrode.

11. Electrical apparatus comprising a discharge tube having an evacuated envelope, an electron-beam generating system including a control electrode and a passive collector electrode spaced from said control electrode and from a fixed point lying in the path of the electron beam between the control electrode and the collector electrode, means including said control electrode for varying the intensity of the electron beam, means for generating an electron-director field extending over substantially the entire distance between said fixed point and said passive collector electrode for impressing a curvilinear path to the electron-beam between said fixed point and said collector electrode, and means to modulate the intensity of said director field to produce variations in the time of travel of the beam between said fixed point and the collector electrode.

EDOUARD LABIN.